March 31, 1931.   W. H. MECHLING   1,798,165
ELEVATOR SAFETY DEVICE
Filed Feb. 19, 1929
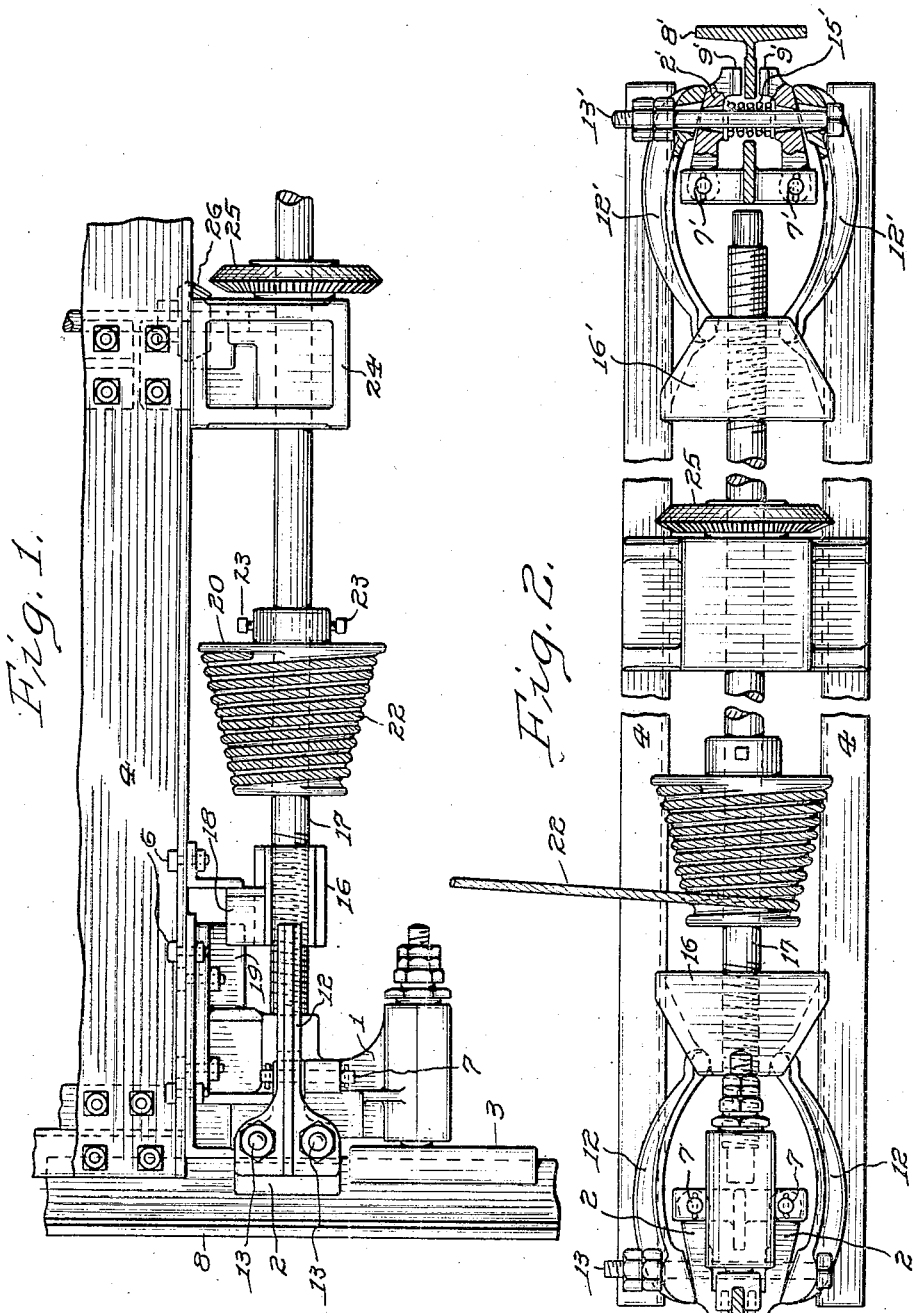
INVENTOR
William H. Mechling,
BY
ATTORNEYS
WITNESS
F. J. Hartman.

Patented Mar. 31, 1931

1,798,165

UNITED STATES PATENT OFFICE

WILLIAM H. MECHLING, OF WHITEMARSH, PENNSYLVANIA

ELEVATOR SAFETY DEVICE

Application filed February 19, 1929. Serial No. 341,125.

My invention relates more particularly to improvements in safety devices designed to arrest the descent of the elevator car by the application of friction brake shoes to the elevator guide rails when the speed of the elevator's descent reaches or exceeds a given rate.

Safety devices of this type usually comprise two pairs of brake arms, ordinarily provided with suitable shoes, and respectively disposed at each side of and beneath the elevator car upon opposite sides of the adjacent guide rail and thus in position to engage the rail when forced against it, the actuation of each pair of arms being effected through pivoted levers so disposed that their outer ends engage the arms and their inner ends engage the inclined faces of a wedge nut which is threaded to a shaft extending transversely beneath the elevator, the threads in one nut and on that end of the shaft on which it is mounted being oppositely inclined from those in the other nut and on the opposite end of the shaft. For effecting rotation of the shaft so as to move the nuts thereon to apply the brakes when required, there is ordinarily disposed on the shaft between the nuts a cylindrical spirally grooved drum, to one end of the groove in which is secured a cable, which is wound about the drum and is led therefrom over suitable sheaves to the endless governor cable at the side of the hatchway and is interconnected therewith. The direction of the spiral of the drum groove is such that as the drum is rotated through the unwinding of the cable to thereby rotate the shaft, the wedge nuts actuating the brake arms are oppositely moved so as to apply the brakes, the direction of the movement of the nuts being towards the ends of the shaft.

In safety devices of this general character, the action of the governor in the top of the hatch is such that when the car is moving at normal speed no pull is exerted on the cable of the safety device as the car and the governor cable move synchronously, but when the speed of the car is increased beyond a predetermined rate the governor resists the free movement of the governor cable with the result that the cable of the safety device is unwound from the grooved drum beneath the car, thereby rotating the shaft of the safety device and causing the brake shoes to be forced against the guide rails so as to bring the car to rest. A rewinding mechanism is usually provided for manually rewinding the drum when it is desired to release the brakes after they have been thus applied.

While this arrangement has met with some success, there have, nevertheless, been serious disadvantages accompanying its use. Thus the necessity of maintaining sufficient clearance between the brake shoes and the guide rails to permit freedom of normal operation and prevent objectionable drag and wear has heretofore made it impossible to make the brakes quickly effective when needed, since the ordinary construction does not permit rapid taking up of this clearance between the shoes and the rail with the result that before the shoes can be brought into engagement with the rails the car has attained excessive speed and momentum so that the brakes must be applied very powerfully to bring it to a stop, while, on the other hand, the distance through which it has travelled before it can be brought to rest is much greater than is desirable.

Another disadvantage of the safety devices of the type to which I have referred resides in the fact that as the braking force applied is constant, or nearly so, throughout the period of bringing the car to rest, the action of the brakes is rough and jerky, and the resulting jolting and jarring of the car is extremely undesirable, especially when carrying human passengers, while the brake shoes and guide rails are much more likely to be damaged during the braking operation than when the braking force is initially applied rapidly but relatively lightly and then gradually increased to a maximum.

In my invention I have directed my attention to the avoidance of these, among other, objectionable features of the safety devices heretofore employed, and have devised means for securing great rapidity in the initial application of the braking force and a subsequent gradual increase therein as well as other objects, advantages and novel features of construction and arrangement hereinafter mentioned or which will appear from the following description of one embodiment of my invention as illustrated in the accompanying drawing.

In the said drawing Fig. 1 is a fragmentary side elevation of my improved safety device in operative association with an elevator, while Fig. 2 is a bottom-plan view thereof with certain parts broken away into section and showing the braking mechanisms at both sides of the elevator, only so much of the latter being illustrated, however, as is necessary for a proper understanding of the invention. It will be noted that in Fig. 2 I have used the same characters to denote corresponding parts on both sides of the center line of the elevator but with the addition of a prime (') in the case of those on the right hand side thereof when viewed as in said figure.

As shown, the bracket 1 serving as a support both for the brake arms 2 and for the guide shoe 3, which may be of ordinary type, is securely mounted beneath the elevator car upon the floor joists 4 as by bolts 6. The brake arms 2 are pivoted at their inner ends on vertically disposed pivot pins 7 carried by the bracket and extend outwardly so as to embrace the usual guide rail 8 in the hatchway and each brake arm is provided at its outer end with a brake shoe 9 of hardened steel or other material suitable for frictional engagement with the rail. The brake arms are adapted to be actuated by lever arms 12 which are arranged to bear thereon at their outer ends and are there held in place by fulcrum bolts 13 which are loosely extended through the lever arms and the brake arms, a coil spring 15 surrounding each bolt between the latter serving to urge the brake arms apart and thus normally hold their shoes out of engagement with the guide rail, sufficient clearance being provided between the shoes and the rail so they will not contact therewith during the normal operation of the elevator irrespective of any slight irregularities in the rail or swaying of the car as it moves in the hatchway.

The inner ends of the lever arms are arranged to bear on opposite sides of a wedge nut 16 which is threaded on a shaft 17 extending horizontally beneath the car floor, the threads at the respective ends of the shaft being oppositely inclined; thus, for example, I have shown a left hand thread at the left hand end of the shaft and a right hand thread at the right hand end thereof, the adjacent wedge nuts 16, 16' being of course correspondingly internally threaded. Means are also provided for preventing rotation of the wedge nut with the shaft, said means, as shown, comprising a vertically slotted lug 18 extending upwardly from the nut and receiving a downwardly directed fin 19 integral with the bracket; thus when the shaft is rotated, the wedge nuts, being prevented from rotating with it through the engagement of the fins 19 in the lugs 18, are constrained to simultaneously move in or out, that is, toward or away from each other in accordance with the direction of rotation of the shaft. A stop 19 may be mounted on the joists 4 to limit the possible inward movement of each nut.

For effecting rotation of the shaft there is mounted thereon between the nuts a drum 20 of conical or frusto-conical form and desirably provided with an exterior spiral groove extending substantially from one end of the drum to the other and adapted to receive a cable 22 when wound upon the drum. The drum is rigidly secured to the shaft as by set screws 23 or in any other suitable way and the end of the cable also secured to the drum in that portion of the groove adjacent its larger end.

It will of course be understood that the shaft 17 is suitably journaled at its ends in the brackets 1, 1' and is also desirably supported near its center in a hanger 24 depending from the floor joists, while any convenient means for winding and rewinding the cable upon the drum such, for example, as a bevel gear 25 on the shaft and a pinion 26 engageable therewith when required and rotatable manually or otherwise by any suitable mechanism (not shown) is desirably provided.

The cable 22 is led from the smaller end of the drum over a sheave or sheaves (not shown) positioned at any suitable point beneath the car and from thence is carried up alongside the car in the hatchway and interconnected with the governor cable extending in the hatchway as heretofore described; as the lead of the cable after it leaves the drum and the arrangement of the sheaves and governor mechanism is such as is commonly employed in the art in connection with safety devices of the general character of those to which my invention relates and is therefore well understood, the same has not been illustrated and requires no further reference.

With the parts constructed and arranged substantially as heretofore described, it will be apparent that when the elevator attains or exceeds the predetermined speed at which the governor is set to operate the cable of the safety device 22 will be unwound progressively from the smaller to the larger end of the drum, thereby rotating the drum initially at a relatively high rate of speed with corresponding rotation of the shaft 17 so as to move the wedge nuts rapidly outward in opposite directions, the lead of the groove in the drum being such as to rotate the shaft in the proper direction to effect this result when the cable is unwound from the drum, thereby quickly separating the inner ends of the lever arms and rapidly bringing the brake shoes against the guide rail. Thus the normal clearance between the brake shoes and guide rail is very quickly taken up and the shoes brought to braking position in a minimum of time and before the elevator has materially exceeded its normal momentum at its maximum normal speed. However, as the cable continues to be progressively unwound from the drum, the rotational speed of the latter, and in turn of the shaft, correspondingly decreases but the power with which the brake shoes are applied to the guide rails progressively increases due to the progressively greater leverage exerted by the cable in turning the shaft, since as the cable is progressively unwound from the drum the point where it departs therefrom moves further and further away from its axis of rotation.

Consequently the shoes are pressed more and more firmly against the guide rails so long as the elevator is descending, and the cable therefore being unwound from the drum, until the elevator is finally brought to rest. When this has been accomplished the ordinary elevator brakes may be set in the usual way and the shaft 17 rotated in the opposite direction through the rewinding mechanism so as to rewind the safety cable upon the drum and return the brake arms and other parts of the safety device to normal position as shown in the drawing.

It will thus be apparent that in a safety device constructed in accordance with my invention the provision of the frusto-conical drum in place of the cylindrical drum heretofore employed results in effecting an extremely rapid initial application of the safety brakes and, thereafter, in a progressive increase in the force with which those brakes are applied; in consequence, it is impossible for the car to attain an undesirably excessive speed and momentum between the time when the safety device begins to operate, that is when the cable starts to unwind from the drum, and the time when the brakes are first applied. Thus considerably less braking force is required to bring the car to a stop in a given distance than would otherwise be the case, while, additionally, as this force is progressively and increasingly applied after the brake shoes have engaged the guide rails so that the car is brought fully to rest in a relatively short distance and without any unpleasant jerking or roughness.

While I have herein described and illustrated with some particularity one form of safety device constructed in accordance with my invention, I do not thereby desire or intend to in any way confine myself thereto as the invention is capable of adaptation to many forms of safety devices other than that to which I have chosen to refer and may, if desired, be readily embodied therein without departing from the spirit and scope of the invention as defined by the appended claims.

Having thus described my invention I claim and desire to protect by Letters Patent of the United States:

1. In an elevator safety device, the combination with an elevator comprising a cross beam, of hangers disposed adjacent the ends of said cross beam, a pair of brake arms supported by each of said hangers, a brake shoe carried by each arm and adapted to engage a guide rail, resilient means disposed between the brake arms of each pair thereof, a pair of lever arms adapted to embrace each pair of brake arms, a pair of fulcrum bolts operative to maintain each pair of lever arms in operative relation with the associated pair of brake arms, a pair of wedge nuts, one disposed adjacent each pair of lever arms and operable to actuate said arms, a rotatable shaft having its respective ends oppositely threaded into said wedge nuts, whereby rotation of the shaft is operative to move said nuts in opposite directions, a frusto-conical drum supported on said shaft and disposed in non-rotatable relation thereto, said drum having a spiral groove in its conical surface adapted to receive a flexible cable, a cable spirally wound in said groove, and means for drawing the cable tangentially and progressively from the drum from the smaller end toward the larger end thereof to thereby effect intimate engagement between the brake shoes and the guide rails.

2. In an elevator safety device, the combination with guide rails disposed adjacent opposite sides of an elevator shaft, a cross beam vertically movable between the guide rails and braking mechanism supported by said cross beam and comprising a plurality of brake shoes operable to engage the rails, a plurality of springs normally operative to maintain said shoes in non-engaging relation with said rails, compound levers operable to actuate said brake shoes, a rotatable shaft supported in parallel relation with said cross beam, wedge nuts carried by said shaft adjacent the ends thereof and operable when moved longitudinally outwardly on said shaft to actuate said compound levers, a drum carried by the shaft in non-rotatable relation thereto, said drum having a frusto-conical outer surface, a cable wound on said outer surface and operable when withdrawn therefrom to effect rotation of the drum, and means for drawing the cable from the drum.

3. The combination with an elevator safety device comprising two pairs of brake shoes oppositely disposed adjacent guide rails in an elevator shaft and compound levers operable to actuate said shoes, of means operable to actuate said compound levers comprising a shaft rotatably supported between said pairs of brake shoes, wedge nuts disposed adjacent the ends of the shaft and in threaded engagement therewith, whereby rotation of the shaft in one direction is effective to move said wedge nuts oppositely outwardly to thereby actuate said levers, a drum carried by the shaft and having a spiral groove adapted to receive a cable, a cable disposed in said groove, and means for drawing the cable from the drum whereby the drum is rotated at progressively decreasing speed to thereby effect relatively rapid initial engagement of the brake shoes with the rails, and thereafter to effect relatively slow compression of the rails between said shoes.

In witness whereof, I have hereunto set my hand this 18th day of February, 1929.

WILLIAM H. MECHLING.